(12) United States Patent
Yasuda et al.

(10) Patent No.: US 9,283,680 B2
(45) Date of Patent: Mar. 15, 2016

(54) WORKPIECE DETECTOR, ROBOT SYSTEM, METHOD FOR PRODUCING TO-BE-PROCESSED MATERIAL, METHOD FOR DETECTING WORKPIECE

(71) Applicant: KABUSHIKI KAISHA YASKAWA DENKI, Kitakyushu-shi (JP)

(72) Inventors: Yuya Yasuda, Kitakyushu (JP); Issei Aoyama, Kitakyushu (JP); Toshimitsu Irie, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/295,261

(22) Filed: Jun. 3, 2014

(65) Prior Publication Data

US 2014/0365010 A1    Dec. 11, 2014

(30) Foreign Application Priority Data

Jun. 7, 2013  (JP) ................................. 2013-120741

(51) Int. Cl.
  *G05B 15/00*  (2006.01)
  *G05B 19/00*  (2006.01)
  *B25J 9/16*  (2006.01)
  (Continued)

(52) U.S. Cl.
  CPC ........... *B25J 9/1697* (2013.01); *G06K 9/00201* (2013.01); *G06K 9/00664* (2013.01); *H04N 7/183* (2013.01); *G05B 2219/40053* (2013.01)

(58) Field of Classification Search
  CPC ... B25J 9/1697; H04N 7/183; G06K 9/00201; G06K 9/00664; G05B 2219/40053

USPC .......... 700/245, 249, 250, 253, 255, 258.259; 318/568.11, 568.12, 568.16
See application file for complete search history.

(56) References Cited

U.S. PATENT DOCUMENTS

| | | | |
|---|---|---|---|
| 6,845,296 B2 * | 1/2005 | Ban et al. ...................... | 700/245 |
| 7,313,464 B1 * | 12/2007 | Perreault et al. .............. | 700/245 |
| 8,295,975 B2 * | 10/2012 | Arimatsu et al. ............. | 700/216 |

(Continued)

FOREIGN PATENT DOCUMENTS

JP    2008-087074    4/2008

OTHER PUBLICATIONS

Extended European Search Report for corresponding EP Application No. 14170877.6-1807, Feb. 26, 2015.

*Primary Examiner* — Jaime Figueroa
(74) *Attorney, Agent, or Firm* — Mori & Ward, LLP

(57) ABSTRACT

A workpiece detector includes a camera to acquire a two-dimensional image of a search range within which workpieces are disposed. A three-dimensional sensor detects a three-dimensional shape of a three-dimensional detection area. A workpiece extraction section processes the two-dimensional image to extract candidate workpieces. An area setting section sets a three-dimensional detection areas respectively corresponding to the candidate workpieces. A prioritizing section sets an order of priority to the three-dimensional detection areas to give higher priority to one three-dimensional detection area containing more of the candidate workpieces. A sensor control section controls the three-dimensional sensor to detect the three-dimensional shape of each three-dimensional detection area in the order of priority. Every time the three-dimensional shape is detected, a workpiece detection section searches the workpieces based on the detected three-dimensional shape to detect a pickable workpiece.

20 Claims, 5 Drawing Sheets

(51) Int. Cl.
　　*G06K 9/00*　　(2006.01)
　　*H04N 7/18*　　(2006.01)

(56) References Cited

U.S. PATENT DOCUMENTS

| | | | |
|---|---|---|---|
| 8,559,699 B2 * | 10/2013 | Boca | 382/153 |
| 8,825,212 B2 * | 9/2014 | Irie et al. | 700/259 |
| 2004/0019405 A1 * | 1/2004 | Ban et al. | 700/213 |
| 2007/0177790 A1 * | 8/2007 | Ban et al. | 382/153 |
| 2007/0274812 A1 * | 11/2007 | Ban et al. | 414/217 |
| 2008/0082213 A1 | 4/2008 | Ban et al. | |
| 2011/0251717 A1 | 10/2011 | Furukawa | |
| 2012/0296474 A1 * | 11/2012 | Irie et al. | 700/259 |

\* cited by examiner

WORKPIECE DETECTOR, ROBOT SYSTEM, METHOD FOR PRODUCING TO-BE-PROCESSED MATERIAL, METHOD FOR DETECTING WORKPIECE

CROSS-REFERENCE TO RELATED APPLICATIONS

The present application claims priority under 35 U.S.C. §119 to Japanese Patent Application No. 2013-120741, filed Jun. 7, 2013. The contents of this application are incorporated herein by reference in their entirety.

BACKGROUND OF THE INVENTION

1. Field of the Invention

The present invention relates to a workpiece detector, a robot system, a method for producing a to-be-processed material, and a method for detecting a workpiece.

2. Discussion of the Background

Robot systems to transfer workpieces in order from a random stack of workpieces are in practical use. For example, Japanese Unexamined Patent Application Publication No. 2008-87074 discloses a robot system that processes a two-dimensional image acquired by a camera to extract a plurality of candidate workpieces.

SUMMARY

According to one aspect of the present disclosure, a workpiece detector includes a camera, a three-dimensional sensor, a workpiece extraction section, an area setting section, a prioritizing section, a sensor control section, and a workpiece detection section. The camera is configured to acquire a two-dimensional image of a search range within which workpieces are disposed. The three-dimensional sensor is configured to detect a three-dimensional shape of a three-dimensional detection area. The workpiece extraction section is configured to process the two-dimensional image to extract a plurality of candidate workpieces among the workpieces. The area setting section is configured to set a plurality of three-dimensional detection areas respectively corresponding to the plurality of candidate workpieces. The prioritizing section is configured to set an order of priority to the plurality of three-dimensional detection areas so as to give higher priority to one three-dimensional detection area among the plurality of three-dimensional detection areas when the one three-dimensional detection area contains more of the plurality of candidate workpieces. The sensor control section is configured to control the three-dimensional sensor to detect the three-dimensional shape of each of the plurality of three-dimensional detection areas in the order of priority. The workpiece detection section is configured to, every time the three-dimensional shape is detected, search the workpieces based on the detected three-dimensional shape so as to detect a pickable workpiece among the workpieces.

According to another aspect of the present disclosure, a robot system includes the above-described workpiece detector, a robot, and a robot controller. The robot includes a holding mechanism configured to hold a workpiece among the workpieces. The robot controller is configured to control the robot to make the holding mechanism hold and transfer a workpiece among the workpieces detected by the workpiece detector.

According to another aspect of the present disclosure, a method for producing a to-be-processed material includes acquiring, using a camera, a two-dimensional image of a search range within which workpieces are disposed. The two-dimensional image is processed to extract a plurality of candidate workpieces among the workpieces. A plurality of three-dimensional detection areas are set respectively corresponding to the plurality of candidate workpieces. An order of priority is set to the plurality of three-dimensional detection areas so as to give higher priority to one three-dimensional detection area among the plurality of three-dimensional detection areas when the one three-dimensional detection area contains more of the plurality of candidate workpieces. Using a three-dimensional sensor, a three-dimensional shape of each of the plurality of three-dimensional detection areas is detected in the order of priority. Every time the three-dimensional shape is detected, the workpieces are searched based on the detected three-dimensional shape so as to detect a pickable workpiece among the workpieces. The detected workpiece is held using a holding mechanism of a robot. Using the robot, the workpiece held by the holding mechanism is transferred to a next process.

According to the other aspect of the present disclosure, a method for detecting a workpiece includes acquiring, using a camera, a two-dimensional image of a search range within which workpieces are disposed. The two-dimensional image is processed to extract a plurality of candidate workpieces among the workpieces. A plurality of three-dimensional detection areas are set respectively corresponding to the plurality of candidate workpieces. An order of priority is set to the plurality of three-dimensional detection areas so as to give higher priority to one three-dimensional detection area among the plurality of three-dimensional detection areas when the one three-dimensional detection area contains more of the plurality of candidate workpieces. Using a three-dimensional sensor, a three-dimensional shape of each of the plurality of three-dimensional detection areas is detected in the order of priority. Every time the three-dimensional shape is detected, the workpieces are searched based on the detected three-dimensional shape so as to detect a pickable workpiece among the workpieces.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
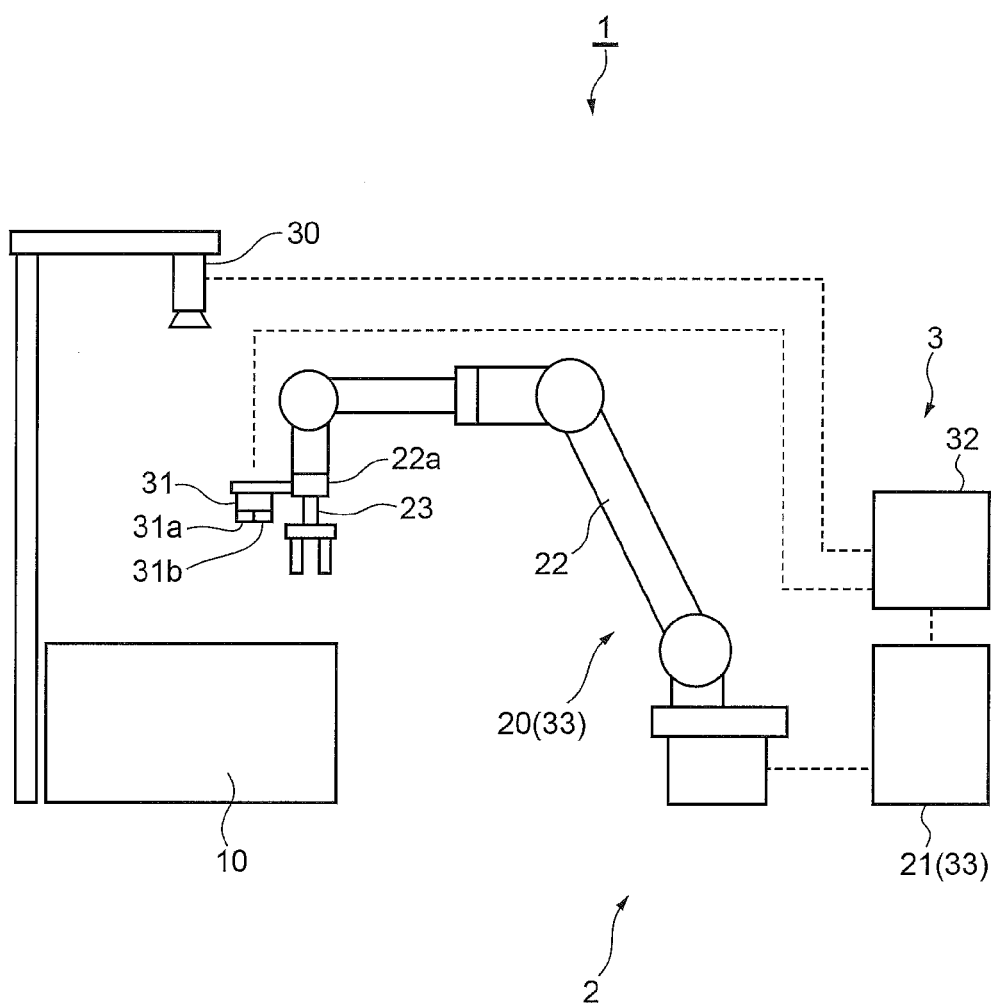
FIG. 1 is a schematic view of a robot system according to an embodiment.

The embodiments will now be described with reference to the accompanying drawings, wherein like reference numerals designate corresponding or identical elements throughout the various drawings.

As shown in FIG. 1, a robot system 1 includes a robot apparatus 2 and a workpiece detector 3. A stocker 10 accommodates workpieces, and the robot system 1 picks up a workpiece from the stocker 10 and transfers the workpiece.

The stocker 10 is a container with open top and accommodates a plurality of workpieces randomly (in bulk). The bottom of the stocker 10 constitutes a placement area A0, in which workpieces are placeable (see FIG. 4).

The robot apparatus 2 includes a robot 20 and a robot controller 21, and transfers a workpiece out of the stocker 10. The robot 20 includes an arm 22 and a holding mechanism 23. An example of the arm 22 is a serial link arm. The holding mechanism 23 is mounted to a wrist 22a of the arm 22. The holding mechanism 23 includes a plurality of fingers 23a, and opens and closes the plurality of fingers 23a to hold the workpiece. It is also possible for the holding mechanism 23 to hold the workpiece by suction.

The workpiece detector 3 includes a camera 30, a three-dimensional sensor 31, and a workpiece detection controller 32. The camera 30 is disposed over the stocker 10 to acquire a two-dimensional image of a search range that contains the workpieces stored in the stocker 10. An example of the search range is a range that contains the entirety of the stocker 10. Examples of the camera 30 include, but are not limited to, a CCD camera and a CMOS camera.

The three-dimensional sensor 31 includes a laser scanner 31a and an optical receiver 31b. The laser scanner 31a changes the outgoing angle of laser light by turning a mirror so as to radiate the laser light to a measurement target under the laser scanner 31a. The optical receiver 31b receives reflection light from the measurement target. The three-dimensional sensor 31 uses the outgoing angle of the laser light, the light receiving position of the optical receiver 31b, and other parameters to detect a three-dimensional shape of the measurement target based on a principle of triangulation. The target range of measurement by the three-dimensional sensor 31 will be hereinafter referred to as "three-dimensional detection area".

The three-dimensional sensor 31 is mounted to the wrist 22a of the arm 22, and the workpiece detector 3 uses the robot 20 and the robot controller 21 as a transfer mechanism for the three-dimensional sensor 31. Specifically, the workpiece detector 3 includes a sensor transfer mechanism 33. The sensor transfer mechanism 33 is made up of the robot 20 and the robot controller 21. Using the robot 20 and the robot controller 21 to transfer the workpiece and to transfer the three-dimensional sensor 31 simplifies the configuration of the robot system 1.

Figure 2:
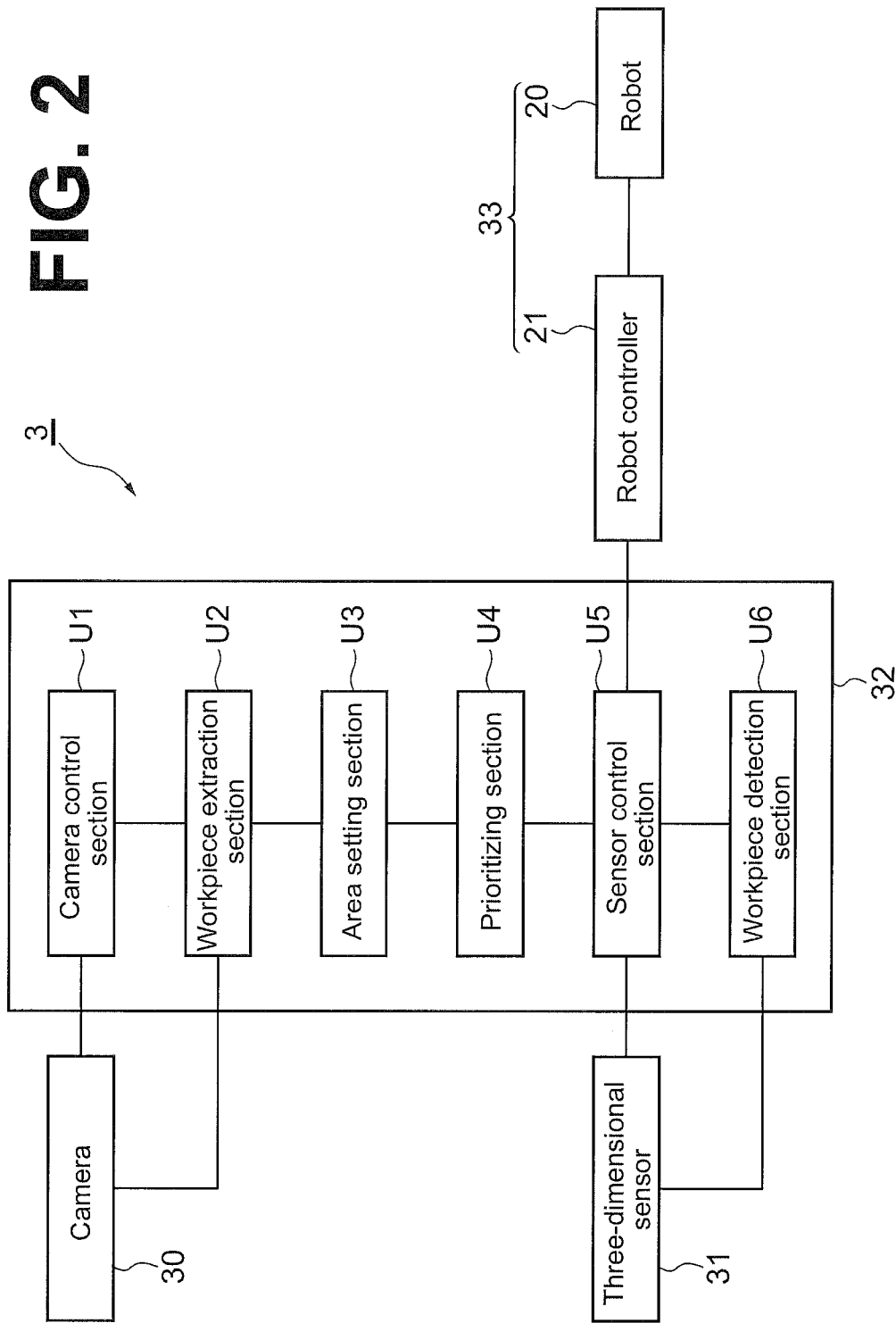
FIG. 2 is a block diagram illustrating a functional configuration of a workpiece detector.

The workpiece detection controller 32 is a computer to control the camera 30, the three-dimensional sensor 31, and the sensor transfer mechanism 33 to execute the method for detecting a workpiece according to this embodiment. As shown in FIG. 2, the workpiece detection controller 32 includes a camera control section U1, a workpiece extraction section U2, an area setting section U3, a prioritizing section U4, a sensor control section U5, and a workpiece detection section U6.

The camera control section U1 controls the camera 30 to acquire the two-dimensional image of the search range. The workpiece extraction section U2 processes the two-dimensional image acquired by the camera 30 to extract a plurality of candidate workpieces. The area setting section U3 sets a plurality of three-dimensional detection areas respectively corresponding to the plurality of candidate workpieces extracted by the workpiece extraction section U2. The prioritizing section U4 sets an order of priority to the plurality of three-dimensional detection areas.

The sensor control section U5 controls the three-dimensional sensor 31 and the sensor transfer mechanism 33 to detect the three-dimensional shapes of the three-dimensional detection areas in the order of priority. Specifically, the sensor control section U5 controls the sensor transfer mechanism 33 to move the three-dimensional sensor 31 to a position over a three-dimensional detection area of higher priority, and controls the three-dimensional sensor 31 to acquire a three-dimensional shape of the three-dimensional detection area of higher priority. Every time the three-dimensional sensor 31 detects a three-dimensional shape, the workpiece detection section U6 searches the workpieces based on the three-dimensional shape to detect a pickable workpiece.

Figure 3:
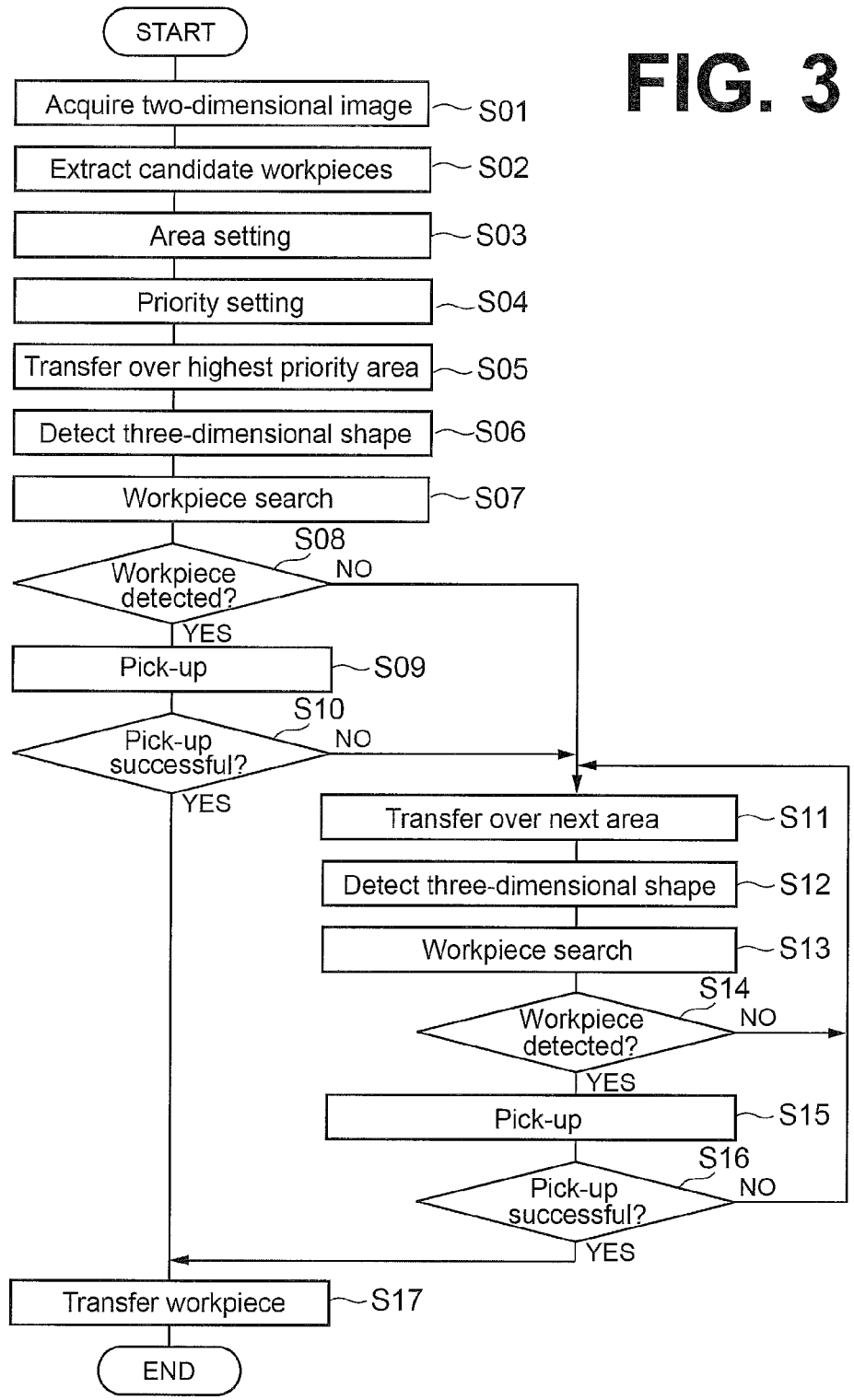
FIG. 3 is a flowchart of a workpiece take-out procedure.

Next, a workpiece transfer procedure executed by the robot system 1 will be described. This procedure includes the method for detecting a workpiece executed by the workpiece detection controller 32. As shown in FIG. 3, first, the camera control section U1 controls the camera 30 to acquire the two-dimensional image of the search range (S01).

Next, the two-dimensional image is processed, and thus a plurality of candidate workpieces are extracted from the search range (S02). Specifically, a plurality of workpieces are recognized by image processing, and those workpieces among the plurality of workpieces that satisfy an extraction condition are extracted as candidate workpieces. An example of the extraction condition is that no other workpieces are superimposed on one workpiece. Another example of the extraction condition is that a particular surface of the workpiece is facing upward. In order to determine whether some other workpiece is superimposed on one workpiece, a determination may be made as to whether an outline of the workpiece is recognized without interruptions. It is possible to determine whether a particular surface of the workpiece is facing upward based on the outline shape of the workpiece.

It is noted that these extraction conditions should not be construed in a limiting sense. Another example of the extraction condition is that there is enough space for the holding mechanism 23. In order to determine whether this condition is satisfied, a determination may be made as to whether some other workpiece exists around the held portion of the workpiece.

Next, a plurality of three-dimensional detection areas respectively corresponding to the plurality of candidate workpieces are set (S03). For example, a three-dimensional detection area is set for each candidate workpiece and centered around the candidate workpiece.

Figure 4:
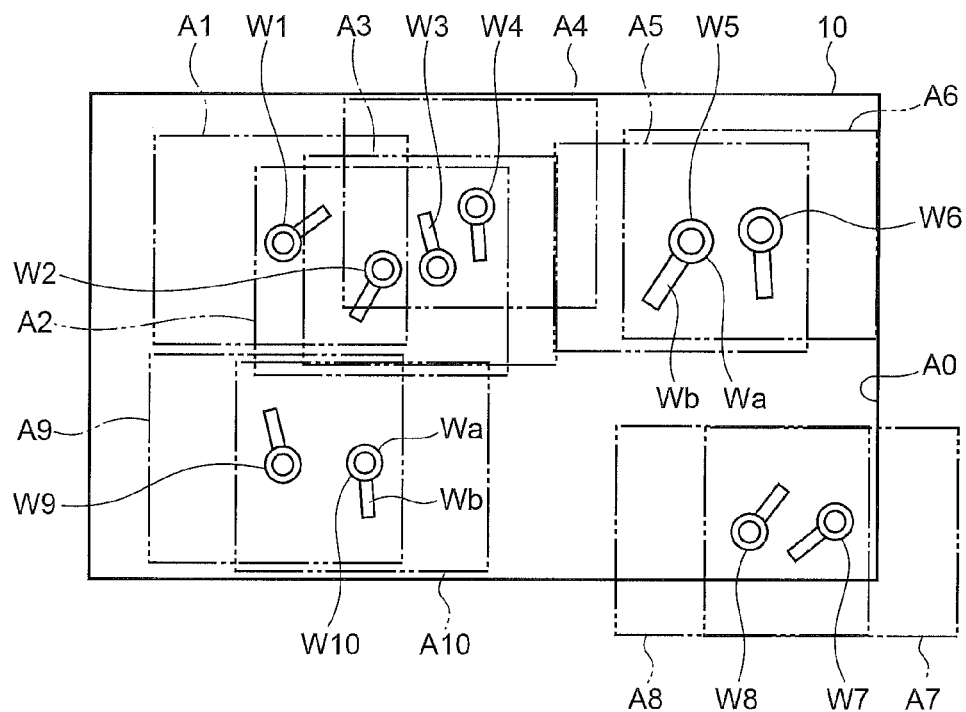
FIG. 4 schematically illustrates exemplary candidate workpieces and three-dimensional detection areas.

By referring to FIG. 4, description will be made with regard to a specific example of how to extract and set a three-dimensional detection area of a candidate workpiece. As shown in FIG. 4, each workpiece includes a ring-shaped portion Wa and a bar-shaped portion Wb. The bar-shaped portion Wb is protruded radially outward from the ring-shaped portion Wa. Extraction conditions are that no other workpieces are superimposed on one workpiece, and that the surface of the workpiece orthogonal to the center axis of the ring-shaped portion Wa is facing upward. Workpieces W1 to W10 satisfy these conditions and are therefore extracted as candidate workpieces. The workpieces W1 to W10 have no interruptions on their outlines and have ring-shaped outlines at their ring-shaped portions Wa. Then, a plurality of areas A1 to A10 are set as three-dimensional detection areas. The plurality of areas A1 to A10 are respectively centered around the workpieces W1 to W10.

Next, as shown in FIG. 3, the prioritizing section U4 sets an order of priority to the plurality of three-dimensional detection areas (S04). The prioritizing section U4 gives higher priority to a three-dimensional detection area when the three-dimensional detection area contains more of the candidate workpieces (hereinafter referred to as "incorporated candidate workpieces"). Also the prioritizing section U4 gives higher priority to a three-dimensional detection area when the three-dimensional detection area has a smaller area overlapping the placement area A0. Further, the prioritizing section U4 gives higher priority to a three-dimensional detection area when the three-dimensional detection area contains a candidate workpiece with a higher photography magnification in the two-dimensional image. These settings may be based on a score P, which can be obtained from the following equation. As the score P for a three-dimensional detection area increases, the three-dimensional detection area may be given higher priority.

$$P=Z/S$$

where Z denotes a sum of photography magnifications of all candidate workpieces contained in a three-dimensional detection area, and S denotes an overlapping area.

Specifically, the sum Z of photography magnifications increases as the number of incorporated candidate workpieces increases and/or as the photography magnification of each candidate workpiece increases. Since the sum Z is the numerator of the score P, the score P increases as the number of incorporated candidate workpieces increases and/or as the photography magnification of each candidate workpiece increases. Since the overlapping area S is the denominator of the score P, the score P increases as the area S becomes smaller.

Also the prioritizing section U4 gives lower priority to another three-dimensional detection area of lower priority than the higher priority of the above-described three-dimensional detection area when the another three-dimensional detection area has a larger area overlapping the above-described three-dimensional detection area of higher priority. The prioritizing section U4 may give lower priority to one of three-dimensional detection areas of the same priority when the overlapping area of the three-dimensional detection areas increases. An example of this priority adjustment based on increase in overlap of three-dimensional detection areas is to set a threshold to the overlapping area of the three-dimensional detection areas, and to start a priority adjustment when the overlapping area exceeds the threshold. Another example is to set a threshold to an intercentral distance between three-dimensional detection areas, and to start a priority adjustment when the intercentral distance falls below the threshold. It is noted that giving lower priority to a three-dimensional detection area encompasses excluding this three-dimensional detection area as a detection target.

A specific example of priority setting will be described by referring to FIG. 4. Assume that the only condition is that as the number of incorporated candidate workpieces increases, a three-dimensional detection area is given higher priority. Under this condition, an area A2 incorporates four candidate workpieces and thus is highest in priority; an area A3 incorporates approximately 3.5 candidate workpieces and thus is second highest in priority; an area A4 incorporates three candidate workpieces and thus is third highest in priority; and areas A1, A5, A6, A7, A8, A9, and A10 incorporate two candidate workpieces and thus are fourth highest in priority.

An additional condition taken into consideration is that as the overlapping area becomes smaller, a three-dimensional detection area is given higher priority. The areas A7 and A8 contain a peripheral edge of the placement area A0, and thus the overlapping area of the areas A7 and A8 is smaller than other overlapping areas. In view of this, the area A7 becomes third highest in priority, while the area A4 is lowered to fourth highest in priority; and the area A8 becomes fifth highest in priority, while the areas A1, A5, A6, A9, A10 are lowered to sixth highest in priority.

Another additional condition taken into consideration is that as the photography magnification of each candidate workpiece increases, a three-dimensional detection area is given higher priority. The workpieces W5 and W6 each have a larger photography magnification than the photography magnifications of other workpieces. In view of this, the areas A5 and A6, which respectively contain the workpieces W5 and W6, become fourth highest in priority, while the area A4 is lowered to sixth highest in priority, the area A8 is lowered to seventh highest in priority, and the areas A1, A9, and A10 are lowered to eighth highest in priority.

Figure 5:
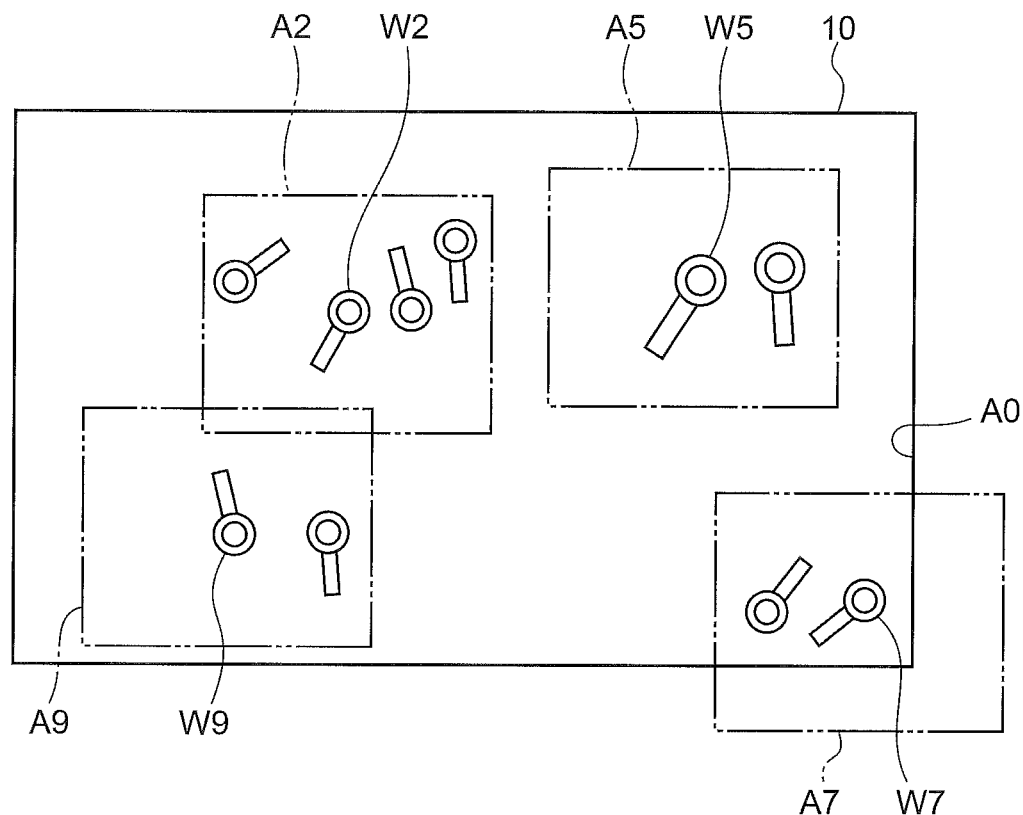
FIG. 5 schematically illustrates a state in which some of the three-dimensional detection area shown in FIG. 4 are excluded as detection targets.

Still another additional condition taken into consideration is that a three-dimensional detection area is given lower priority when the three-dimensional detection area has a larger area overlapping another three-dimensional detection area of higher priority. Under this condition, for example, the areas A1, A3, A4 each have a larger area overlapping the area A2, which is highest in priority, and thus are given lower priority than the areas A9 and A10, which are eighth highest in priority. The area A8 has a larger area overlapping the area A7, which is third highest in priority, and thus is given lower priority than the areas A9 and A10. The areas A5 and A6, which are fourth highest in priority, each have a larger area overlapping other's area, and thus one of the areas A5 and A6 is given lower priority than the areas A9 and A10. The areas A9 and A10, which are eighth highest in priority, each have a larger area overlapping other's area, and thus one of the areas A9 and A10 is given lower priority. As shown in FIG. 5, it is possible to exclude the areas A3, A4, A1, and A8, one of the areas A5 and A6, and one of the areas A9 and A10 as detection targets.

When the priority setting is completed, the three-dimensional sensor 31 is transferred to a position over the three-dimensional detection area of highest priority, as shown in FIG. 3 (S05). Specifically, the sensor control section U5 controls the robot controller 21 and the robot 20, which serve as the sensor transfer mechanism 33, to transfer the three-dimensional sensor 31.

Next, the sensor control section U5 controls the three-dimensional sensor 31 to detect a three-dimensional shape of the three-dimensional detection area (S06). Next, the workpiece detection section U6 searches the workpieces based on the detected three-dimensional shape in an attempt to detect a pickable workpiece (S07). Whether a workpiece is pickable may be determined based on, for example, whether the workpiece is pickable without being interrupted by other workpieces or other objects.

Next, a determination is made as to whether a pickable workpiece has been detected (S08). When a determination is made that a pickable workpiece has been detected, the robot controller 21 controls the robot 20 to pick up the workpiece (S09), and a determination is made as to whether the pick-up was successful (S10). Whether the pick-up was successful may be determined based on the state of the fingers 23a. For example, when the fingers 23a are in contact with each other after an attempt to pick up the workpiece between the fingers 23a, a determination is made that the pick-up was unsuccessful.

When at S08 a determination is made that no workpiece has been detected or when at S10 a determination is made that the pick-up was unsuccessful, then the three-dimensional sensor 31 is transferred a position over a three-dimensional detection area of next highest priority (S11). Specifically, the sensor control section U5 controls the robot controller 21 and the robot 20, which serve as the sensor transfer mechanism 33, to transfer the three-dimensional sensor 31.

Next, the sensor control section U5 controls the three-dimensional sensor 31 to detect a three-dimensional shape of the three-dimensional detection area (S12). Next, the workpiece detection section U6 searches the workpieces based on the detected three-dimensional shape in an attempt to detect a pickable workpiece (S13). Next, a determination is made as to whether a pickable workpiece has been detected (S14). When a determination is made that a pickable workpiece has been detected, the robot controller 21 controls the robot 20 to pick up the workpiece (S15), and a determination is made as to whether the pick-up was successful (S16). When at S14 a determination is made that no workpiece has been detected or when at S16 a determination is made that the pick-up was unsuccessful, then the procedure returns to S11.

Thus, when a pickable workpiece is detected in any of the three-dimensional detection areas and when pick-up of the workpiece is successful, then the robot controller 21 controls the robot 20 to transfer the workpiece (S17). This procedure of processing is repeated until the stocker 10 becomes empty.

The workpiece detector 3 described hereinbefore acquires a two-dimensional image of an entire search range, extracts candidate workpieces and sets three-dimensional detection areas for the candidate workpieces based on the two-dimensional image, and sets an order of priority to the three-dimensional detection areas. The workpiece detector 3 performs these operations before the three-dimensional sensor detects a three-dimensional shape. Then, based on the order of priority that has been set, the three-dimensional sensor detects a three-dimensional shape and searches the workpieces based on the three-dimensional shape. Since a three-dimensional detection area is set for each individual candidate workpiece, all the three-dimensional detection areas reliably contain a candidate workpiece. A three-dimensional detection area containing more candidate workpieces is given higher priority, that is, a three-dimensional detection area containing more candidate workpieces is given priority to undergo workpiece search. This increases the possibility of detecting a workpiece with a smaller number of times of three-dimensional detection (that is, a smaller number of times of detection of a three-dimensional shape). This, in turn, shortens the workpiece detection time.

The prioritizing section U4 gives higher priority to a three-dimensional detection area when the three-dimensional detection area has a smaller area overlapping the placement area A0.

Incidentally, in the step of taking out stacked workpieces in order, if there is a large difference in height between the stack of workpieces, the attempt to pick up a workpiece at a lower height in the stack may be hindered by another workpiece at a greater height in the stack. In view of this, it is preferable to eliminate or minimize the increase in difference in height in taking out a workpiece.

Since no workpieces exist outside the placement area A0, if the priority setting is only based on the number of candidate workpieces, a three-dimensional detection area containing the peripheral edge of the placement area A0 tends to be lower in priority. This makes workpieces in the vicinity of the peripheral edge of the placement area A0 likely to remain undetected. This, in turn, can increase the difference in height between the center and peripheral edge of the placement area A0. This is addressed by giving higher priority to a three-dimensional detection area having a smaller overlapping area, so as to eliminate or minimize lowered priority caused by containing the peripheral edge of the placement area A0. This eliminates or minimizes the increase in difference in height.

The prioritizing section U4 gives higher priority to a three-dimensional detection area when the three-dimensional detection area contains a candidate workpiece with a higher photography magnification in the two-dimensional image. This ensures that a candidate workpiece at a greater height is more likely to be given priority to be transferred. This eliminates or minimizes the increase in difference in height.

The prioritizing section U4 gives lower priority to one three-dimensional detection area of lower priority than priority of another three-dimensional detection area when the one three-dimensional detection area has a larger area overlapping the another three-dimensional detection area. This reduces the possibility of repeated three-dimensional detection in one area, which further shortens the workpiece detection time.

The method for transferring a workpiece using the robot system 1 is applicable to the method for producing a to-be-processed material in the step of, for example, transferring workpieces including parts such as bolts to a next process. Examples of the to-be-processed material include, but are not limited to, various industrial products including consumer machines and industrial machines.

It is not essential to transfer the three-dimensional sensor 31 using the sensor transfer mechanism 33; instead, it is possible to use such a three-dimensional sensor 31 that is capable of three-dimensional detection (three-dimensional shape detection) of the entire search range at a fixed position. Also in this case, partial three-dimensional detection areas are set and prioritized, followed by three-dimensional detection in order. This shortens the workpiece detection time. The prioritizing section U4 sets an order of priority to the three-dimensional detection areas at least under the condition that as the number of incorporated candidate workpieces increases, a three-dimensional detection area is given higher priority. The other conditions are not essential. The three-dimensional sensor 31 may be a stereo camera. The workpiece detection controller 32 and the robot controller 21 may be integral with each other.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A workpiece detector comprising:
   a camera configured to acquire a two-dimensional image of a search range within which workpieces are disposed;
   a three-dimensional sensor configured to detect a three-dimensional shape of a three-dimensional detection area;
   a workpiece extraction section configured to process the two-dimensional image to extract a plurality of candidate workpieces among the workpieces;
   an area setting section configured to set a plurality of three-dimensional detection areas respectively corresponding to the plurality of candidate workpieces;
   a prioritizing section configured to set an order of priority to the plurality of three-dimensional detection areas based at least in part on a quantity of candidate workpieces present in each of the plurality of three-dimensional detection areas so as to give higher priority to one three-dimensional detection area among the plurality of three-dimensional detection areas such that the one three-dimensional detection area that contains more of the plurality of candidate workpieces is given higher priority;

a sensor control section configured to control the three-dimensional sensor to detect the three-dimensional shape of each of the plurality of three-dimensional detection areas in the order of priority; and a workpiece detection section configured to, every time the three-dimensional shape is detected, search the workpieces based on the detected three-dimensional shape so as to detect a pickable workpiece among the workpieces.

2. The workpiece detector according to claim 1, further comprising a transfer mechanism configured to transfer the three-dimensional sensor.

3. A workpiece detector comprising:
a camera configured to acquire a two-dimensional image of a search range within which workpieces are disposed;
a three-dimensional sensor configured to detect a three-dimensional shape of a three-dimensional detection area;
a workpiece extraction section configured to process the two-dimensional image to extract a plurality of candidate workpieces among the workpieces;
an area setting section configured to set a plurality of three-dimensional detection areas respectively corresponding to the plurality of candidate workpieces;
a prioritizing section configured to set an order of priority to the plurality of three-dimensional detection areas so as to give higher priority to one three-dimensional detection area among the plurality of three-dimensional detection areas when the one three-dimensional detection area contains more of the plurality of candidate workpieces;
a sensor control section configured to control the three-dimensional sensor to detect the three-dimensional shape of each of the plurality of three-dimensional detection areas in the order of priority; and
a workpiece detection section configured to, every time the three-dimensional shape is detected, search the workpieces based on the detected three-dimensional shape so as to detect a pickable workpiece among the workpieces,
wherein the prioritizing section is configured to give higher priority to the one three-dimensional detection area when the one three-dimensional detection area has a smaller area overlapping a placement area in which the workpieces are placeable.

4. A workpiece detector comprising:
a camera configured to acquire a two-dimensional image of a search range within which workpieces are disposed;
a three-dimensional sensor configured to detect a three-dimensional shape of a three-dimensional detection area;
a workpiece extraction section configured to process the two-dimensional image to extract a plurality of candidate workpieces among the workpieces;
an area setting section configured to set a plurality of three-dimensional detection areas respectively corresponding to the plurality of candidate workpieces;
a prioritizing section configured to set an order of priority to the plurality of three-dimensional detection areas so as to give higher priority to one three-dimensional detection area among the plurality of three-dimensional detection areas when the one three-dimensional detection area contains more of the plurality of candidate workpieces;
a sensor control section configured to control the three-dimensional sensor to detect the three-dimensional shape of each of the plurality of three-dimensional detection areas in the order of priority; and
a workpiece detection section configured to, every time the three-dimensional shape is detected, search the workpieces based on the detected three-dimensional shape so as to detect a pickable workpiece among the workpieces,
wherein the prioritizing section is configured to give higher priority to the one three-dimensional detection area when the one three-dimensional detection area contains a candidate workpiece with a higher photography magnification in the two-dimensional image.

5. A workpiece detector according to claim 1, comprising:
a camera configured to acquire a two-dimensional image of a search range within which workpieces are disposed;
a three-dimensional sensor configured to detect a three-dimensional shape of a three-dimensional detection area;
a workpiece extraction section configured to process the two-dimensional image to extract a plurality of candidate workpieces among the workpieces;
an area setting section configured to set a plurality of three-dimensional detection areas respectively corresponding to the plurality of candidate workpieces;
a prioritizing section configured to set an order of priority to the plurality of three-dimensional detection areas so as to give higher priority to one three-dimensional detection area among the plurality of three-dimensional detection areas when the one three-dimensional detection area contains more of the plurality of candidate workpieces;
a sensor control section configured to control the three-dimensional sensor to detect the three-dimensional shape of each of the plurality of three-dimensional detection areas in the order of priority; and
a workpiece detection section configured to, every time the three-dimensional shape is detected, search the workpieces based on the detected three-dimensional shape so as to detect a pickable workpiece among the workpieces,
wherein the prioritizing section is configured to give lower priority to another three-dimensional detection area of lower priority than the higher priority of the one three-dimensional detection area when the another three-dimensional detection area has a larger area overlapping the one three-dimensional detection area of higher priority.

6. A robot system comprising:
the workpiece detector according to claim 1;
a robot comprising a holding mechanism configured to hold a workpiece among the workpieces; and
a robot controller configured to control the robot to make the holding mechanism hold and transfer a workpiece among the workpieces detected by the workpiece detector.

7. A robot system comprising:
the workpiece detector according to claim 2;
a robot comprising a holding mechanism configured to hold a workpiece among the workpieces; and
a robot controller configured to control the robot to make the holding mechanism hold and transfer a workpiece among the workpieces detected by the workpiece detector,
wherein the three-dimensional sensor is mounted to the robot, and
wherein the workpiece detector is configured to use the robot and the robot controller as the transfer mechanism.

8. A method for producing a to-be-processed material comprising:
acquiring, using a camera, a two-dimensional image of a search range within which workpieces are disposed;

processing the two-dimensional image to extract a plurality of candidate workpieces among the workpieces;
setting a plurality of three-dimensional detection areas respectively corresponding to the plurality of candidate workpieces;
setting an order of priority to the plurality of three-dimensional detection areas based at least in part on a quantity of candidate workpieces present in each of the plurality of three-dimensional detection areas so as to give higher priority to one three-dimensional detection area among the plurality of three-dimensional detection areas such that the one three-dimensional detection area that contains more of the plurality of candidate workpieces is given higher priority;
detecting, using a three-dimensional sensor, a three-dimensional shape of each of the plurality of three-dimensional detection areas in the order of priority;
every time the three-dimensional shape is detected, searching the workpieces based on the detected three-dimensional shape so as to detect a pickable workpiece among the workpieces;
holding the detected workpiece using a holding mechanism of a robot; and
transferring, using the robot, the workpiece held by the holding mechanism to a next process.

9. A method for detecting a workpiece comprising:
acquiring, using a camera, a two-dimensional image of a search range within which workpieces are disposed;
processing the two-dimensional image to extract a plurality of candidate workpieces among the workpieces;
setting a plurality of three-dimensional detection areas respectively corresponding to the plurality of candidate workpieces;
setting an order of priority to the plurality of three-dimensional detection areas based at least in part on a quantity of candidate workpieces present in each of the plurality of three-dimensional detection areas so as to give higher priority to one three-dimensional detection area among the plurality of three-dimensional detection areas such that the one three-dimensional detection area that contains more of the plurality of candidate workpieces is given higher priority;
detecting, using a three-dimensional sensor, a three-dimensional shape of each of the plurality of three-dimensional detection areas in the order of priority; and
every time the three-dimensional shape is detected, searching the workpieces based on the detected three-dimensional shape so as to detect a pickable workpiece among the workpieces.

10. The workpiece detector according to claim 2, wherein the prioritizing section is configured to give higher priority to the one three-dimensional detection area when the one three-dimensional detection area has a smaller area overlapping a placement area in which the workpieces are placeable.

11. The workpiece detector according to claim 2, wherein the prioritizing section is configured to give higher priority to the one three-dimensional detection area when the one three-dimensional detection area contains a candidate workpiece with a higher photography magnification in the two-dimensional image.

12. The workpiece detector according to claim 3, wherein the prioritizing section is configured to give higher priority to the one three-dimensional detection area when the one three-dimensional detection area contains a candidate workpiece with a higher photography magnification in the two-dimensional image.

13. The workpiece detector according to claim 10, wherein the prioritizing section is configured to give higher priority to the one three-dimensional detection area when the one three-dimensional detection area contains a candidate workpiece with a higher photography magnification in the two-dimensional image.

14. The workpiece detector according to claim 2, wherein the prioritizing section is configured to give lower priority to another three-dimensional detection area of lower priority than the higher priority of the one three-dimensional detection area when the another three-dimensional detection area has a larger area overlapping the one three-dimensional detection area of higher priority.

15. The workpiece detector according to claim 3, wherein the prioritizing section is configured to give lower priority to another three-dimensional detection area of lower priority than the higher priority of the one three-dimensional detection area when the another three-dimensional detection area has a larger area overlapping the one three-dimensional detection area of higher priority.

16. The workpiece detector according to claim 4, wherein the prioritizing section is configured to give lower priority to another three-dimensional detection area of lower priority than the higher priority of the one three-dimensional detection area when the another three-dimensional detection area has a larger area overlapping the one three-dimensional detection area of higher priority.

17. The workpiece detector according to claim 10, wherein the prioritizing section is configured to give lower priority to another three-dimensional detection area of lower priority than the higher priority of the one three-dimensional detection area when the another three-dimensional detection area has a larger area overlapping the one three-dimensional detection area of higher priority.

18. The workpiece detector according to claim 11, wherein the prioritizing section is configured to give lower priority to another three-dimensional detection area of lower priority than the higher priority of the one three-dimensional detection area when the another three-dimensional detection area has a larger area overlapping the one three-dimensional detection area of higher priority.

19. The workpiece detector according to claim 12, wherein the prioritizing section is configured to give lower priority to another three-dimensional detection area of lower priority than the higher priority of the one three-dimensional detection area when the another three-dimensional detection area has a larger area overlapping the one three-dimensional detection area of higher priority.

20. The workpiece detector according to claim 13, wherein the prioritizing section is configured to give lower priority to another three-dimensional detection area of lower priority than the higher priority of the one three-dimensional detection area when the another three-dimensional detection area has a larger area overlapping the one three-dimensional detection area of higher priority.

* * * * *